United States Patent
Higashimori

(10) Patent No.: US 8,128,356 B2
(45) Date of Patent: Mar. 6, 2012

(54) MIXED FLOW TURBINE

(75) Inventor: Hirotaka Higashimori, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 521 days.

(21) Appl. No.: 12/368,345

(22) Filed: Feb. 10, 2009

(65) Prior Publication Data

US 2009/0290980 A1    Nov. 26, 2009

(30) Foreign Application Priority Data

May 20, 2008 (JP) ................. 2008-132403

(51) Int. Cl.
*F04D 29/42* (2006.01)

(52) U.S. Cl. ...................................... 415/205

(58) Field of Classification Search .............. 415/205, 415/206, 164, 163; 60/605.2, 600, 601
See application file for complete search history.

(56) References Cited

U.S. PATENT DOCUMENTS

| | | | | |
|---|---|---|---|---|
| 3,614,259 | A | * | 10/1971 | Neff .................. 415/205 |
| 4,544,326 | A | * | 10/1985 | Nishiguchi et al. .......... 415/151 |
| 5,758,500 | A | * | 6/1998 | Sumser et al. ............... 60/602 |
| 6,216,459 | B1 | * | 4/2001 | Daudel et al. ............. 60/605.2 |
| 6,672,061 | B2 | * | 1/2004 | Schmid et al. ............. 60/605.2 |
| 2004/0105756 | A1 | | 6/2004 | Higashimori |

FOREIGN PATENT DOCUMENTS

| | | |
|---|---|---|
| JP | 57-148024 U | 3/1981 |
| JP | 62-79938 U | 5/1987 |
| JP | 63-302133 A | 12/1988 |
| JP | 1-58727 U | 4/1989 |
| JP | 1-92531 A | 4/1989 |
| JP | 2004-92498 A | 3/2004 |
| JP | 2004-510094 A | 4/2004 |
| JP | 2008-503685 A | 2/2008 |

OTHER PUBLICATIONS

Japanese Office Action dated Nov. 22, 2011, issued in corresponding Japanese Patent Application No. 2008-132403.

* cited by examiner

*Primary Examiner* — Alexander Gilman

(74) *Attorney, Agent, or Firm* — Westerman, Hattori, Daniels & Adrian, LLP

(57) ABSTRACT

To provide a mixed flow turbine in which supply of working fluid is designed to be supplied at a hub and a shroud, and the shape of the inlet-side edges of the blades is made to work effectively, thereby reducing incidence loss. A mixed flow turbine including blades whose leading edges are formed in a convex shape toward the upstream side; and a scroll that is a space formed upstream of the blades by a casing having a shroud that covers the radially external edges of the blades, the space being for supplying working fluid toward the leading edges of the blades, wherein the scroll is separated by a scroll partition wall into a shroud-side space and a hub-side space; and a shroud-side partition wall surface and a hub-side partition wall surface at the rear edge side of the scroll partition wall form a shroud-side inlet channel in which the working fluid flows substantially radially and a hub-side inlet channel in which the working fluid flows substantially in the same direction as the inclination direction of the hub side at the inlet of the blades between the partition wall surfaces and portions facing the partition wall surfaces, respectively.

6 Claims, 11 Drawing Sheets

MIXED FLOW TURBINE

BACKGROUND OF THE INVENTION

1. Field of the Invention

The present invention relates to a mixed flow turbine for use in compact gas turbines, turbochargers, expanders and so on.

2. Description of the Invention

There are constant demands to increase the efficiency of this type of mixed flow turbine.

The efficiency of a turbine is expressed relative to a theoretical speed ratio (=U/CO) that is the ratio of the circumferential speed U of a blade inlet to a maximum flow rate, that is, a theoretical speed CO, at which working fluid (gas) is accelerated in accordance with the temperature and the pressure ratio of a turbine inlet.

One factor that reduces the efficiency is incidence loss. This is caused by the incidence, which is the difference between the flow angle β of gas flowing to the leading edge of a blade and the blade angle βk of the leading edge. That is, when the incidence increases, inflow gas is separated by the leading edge, which increases incidence loss.

Since the whole cross section of a blade of a mixed flow turbine, when cut along a given radius from a rotation axis, including the vicinity of the leading edge is formed in a curve (like a parabola), mixed flow turbines can be designed so that the flow angle β and the blade angle βk come close to each other. Although this allows the incidence of, for example, a hub surface, to come close to zero, incidence occurs between the hub and the shroud.

That is, since the cross section of the blade of the mixed flow turbine, when cut along a radius from a rotation axis, is formed in a curve (like a parabola), the distribution 109 of the flow angle β changes linearly between the hub and the shroud, whereas the distribution 110 of the blade angle βk changes like a parabola, as shown in FIG. 20, so that the incidence at the central area of the blade height increases to the maximum.

Incidence loss due to an increase in incidence caused by the difference between the distribution of the flow angle β and the distribution of the blade angle βk conversely causes an increase in the loss of the mixed flow turbine, decreasing the efficiency thereof.

One example that reduces the decrease in efficiency is proposed in Japanese Unexamined Patent Application, Publication No. 2004-92498.

As shown in FIG. 18 or 19, it is configured such that a leading edge 103 of a moving blade 101 is formed in a convex shape toward the upstream side in the working-fluid flowing direction. Thus, as shown in FIG. 20, a flow angle distribution 115 forms a downwardly convex curve.

As a result, the blade angle distribution 110 of the blade angle βk and the flow angle distribution 115 of the flow angle β come close to each other, particularly at the center between the hub and the shroud, and the incidence becomes Ina. That is, since the incidence decreases by ΔIn, the incidence loss is decreased by a corresponding amount.

One example of a mixed flow turbine is that disclosed in Japanese Unexamined Utility Model Application, Publication No. Sho-62-79938, in which the scroll is separated into two, and working fluid is supplied from one or both of them at the same time so that the supply of the working fluid can be varied.

As shown in FIG. 21, it is configured such that a scroll 120 is separated into a first inlet channel 122 for supplying gas to the hub side of a leading edge 125 of a moving blade 124 and a second inlet channel 123 for supplying gas to the shroud side by means of a partition wall 121. When the quantity of gas is small, for example, it is supplied only through the first inlet channel 122, and when the quantity increases, it is supplied through the first inlet channel 122 and the second inlet channel 123.

Although the one disclosed in Japanese Unexamined Patent Application, Publication No. 2004-92498 exhibits the flow angle distribution 115 shown in FIG. 20 when gas is supplied to the leading edge 103 of the moving blade 101 in an ideal state, actual products cannot be expected to supply gas in such an ideal state.

That is, in general, a flow channel from a scroll 105 to the moving blade 101 extends radially, as shown in FIG. 18, or this flow channel is inclined in such a manner as to extend on the slopes of the shroud surface and the hub surface, as shown in FIG. 19.

Furthermore, a nozzle 107 having a vane-shaped blade is sometimes provided directly upstream of the moving blade 101.

In the case where gas is supplied radially to the moving blade 101, as shown in FIG. 18, the inclination angle δ of the hub-side flow becomes small, which reduces the effect of the upstream convex shape of the leading edge 103 by half and increases the flow angle β of the hub side, as shown in a flow angle distribution 102 in FIG. 20.

This increases the incidence, which is the difference between the blade angle βk and the flow angle β, thus posing the problem of increased loss on the hub side.

As shown in FIG. 19, in the case where gas is supplied at an angle to the moving blade 101, the deflection angle of the flow from the scroll 105 to the shroud at a meridian plane increases because the inclination angle of the shroud is large. Thus, when the deflection angle at the meridian plane increases, the boundary layer on the shroud surface expands at the leading edge of the moving blade 101, so that the flow angle β at the shroud side decreases. That is, the incidence increases in the opposite direction, as shown by the flow angle distribution 104 in FIG. 20, thus posing the problem of increased loss on the shroud side.

On the other hand, the one disclosed in Japanese Unexamined Utility Model Application, Publication No. Sho-62-79938 is configured such that the partition wall 121 is present, as a plate having a limited thickness, upstream from the leading edge 125 of the moving blade 124, which develops a wake 128 downstream from the trailing edge of the partition wall 121, thus increasing loss.

Since the gas from the first inlet channel 122 and the second inlet channel 123 is supplied at an angle to the leading edge 125 of the moving blade 124, a boundary layer 127 develops at the shroud-side wall and the hub-side wall of the leading edge 125, thus increasing loss.

BRIEF SUMMARY OF THE INVENTION

In consideration of the above problems, an object of the present invention is to provide a mixed flow turbine in which working fluid is designed to be supplied at the hub side and the shroud side, and the shape of the inlet-side edges of the blades is used effectively, thereby reducing incidence loss.

To solve the above problems, the present invention adopts the following solutions.

According to an aspect of the present invention, there is provided a mixed flow turbine including: mixed flow turbine moving blades whose outline of inlet-side edges located at an upstream side is formed in a convex shape toward the upstream side; a scroll that is a space formed upstream of the mixed flow turbine moving blades by a casing having a shroud that covers the radially external edges of the mixed flow turbine moving blades, the space being for supplying working fluid toward the inlet-side edges of the mixed flow turbine moving blades, wherein the scroll is separated by a scroll partition wall into a shroud-side space and a hub-side space; and wherein a shroud-side partition wall surface and a hub-side partition wall surface at the rear edge side of the scroll partition wall form a shroud-side inlet channel in which the working fluid flows substantially radially and a hub-side inlet channel in which the working fluid flows substantially in the same direction as the inclination direction of a hub circumferential surface at the inlet of the mixed flow turbine moving blades between the partition wall surfaces and portions facing the partition wall surfaces, respectively.

In the mixed flow turbine moving blades of the mixed flow turbine, regarding the line connecting the hub side and the shroud side of the inlet-side edge, the shroud side is located radially outward.

According to this aspect, the inlet-side edges of the mixed flow turbine moving blades are formed in a convex shape toward the upstream side. In other words, the intermediate portion extends to the upstream side of the line connecting the hub side and the shroud side of the inlet-side edge, so that the shroud-side portion of the inlet-side edge is disposed along substantially the same radial position.

Since working fluid that is supplied from the shroud-side space through the shroud-side inlet channel flows substantially radially, it flows parallel to the shroud-side wall surface and in the direction substantially perpendicular to the inlet-side edges of the moving blades. Thus, this can prevent a wall-surface boundary layer from increasing in size at the shroud portion of the inlets of the mixed flow turbine moving blades.

Since working fluid that is supplied from the hub-side space through the hub-side inlet channel flows in substantially the same direction as the inclination direction of the hub circumferential surface at the inlet of the mixed flow turbine moving blades, it flows parallel to the hub circumferential surface. Thus, this can prevent a wall-surface boundary layer from increasing in size on the hub circumferential surface.

Since the working fluid flows substantially radially in the shroud-side inlet channel, whereas in the hub-side inlet channel, it flows substantially in the same direction as the direction of inclination of the hub side of the inlet of the mixed flow turbine moving blades, the working fluid that has passed through both the inlet channels flows in an intersecting manner to the inlet-side edges of the mixed flow turbine moving blades.

In other words, there is no object that stops the flow of the working fluid at the upstream side, as viewed from the inlet-side edges of the mixed flow turbine moving blades.

Thus, this can prevent development of a wake due to the scroll partition wall.

In this case, the shroud-side partition wall surface and the hub-side partition wall surface at the trailing edge side of the scroll partition wall form a shroud-side inlet channel and a hub-side inlet channel that intersect each other between the partition wall surfaces and portions facing the partition wall surfaces, respectively; therefore, the shroud-side surface and the hub-side surface are extended so as to intersect at the trailing edge side. Thus, if the thickness of the scroll partition wall is eliminated at the trailing edge, occurrence of a wake can be prevented.

Thus, since this can prevent an increase in the size of the wall-surface boundary layer on the hub circumferential surface and the shroud at the inlet-side edges of the mixed flow turbine moving blades and can eliminate the influence of a wake due to the scroll partition wall in the center, an incidence reducing effect of the mixed flow turbine moving blades whose inlet-side edges are formed in a convex shape toward the upstream side can be reliably achieved, and thus incidence loss can be reduced.

In the above aspect, a blade-shaped nozzle whose blade surfaces are formed substantially parallel to a rotation axis may be provided between the scroll partition wall and the mixed flow turbine moving blades.

Provision of this blade-shaped nozzle can increase the circumferential speed of the flow, thus increasing the efficiency of the mixed flow turbine.

Since the blade surfaces of the blade-shaped nozzle are formed substantially parallel to the rotation axis, the nozzle can easily be manufactured by casting.

In the above aspect, the hub-side inlet channel may be provided with a hub-side blade-shaped nozzle whose blade surfaces are formed substantially parallel to a rotation axis.

Since the hub-side inlet channel inclines with respect to the radial direction, it is longer than the shroud-side inlet channel along the radius. Furthermore, since the hub side decreases in radius, the flow rate of the hub side is high in accordance with the conservation of angular momentum. Therefore, the working fluid has increased frictional loss on the hub-side wall surface, and therefore the boundary layer may expand in the vicinity of the inlet of the hub circumferential surface.

Since this configuration is provided with the hub-side blade-shaped nozzle, the circumferential speed of the flow in the hub-side inlet channel can be increased. This can prevent expansion of the boundary layer and improve the efficiency of the mixed flow turbine.

Since the hub-side blade-shaped nozzle is formed such that the blade surfaces are substantially parallel to the rotation axis, the nozzle can easily be manufactured by casting.

In the above configuration, it is preferable that the hub-side blade-shaped nozzle be provided with a guide plate, which is a substantially extended portion of the hub-side blade-shaped nozzle, extended to a position close to the inlet-side edges of the mixed flow turbine moving blades.

Since the hub-side inlet channel inclines with respect to the radial direction, and the hub-side blade-shaped nozzle is formed substantially parallel to the rotation axis, a long space is formed between the trailing edge of the hub-side blade-shaped nozzle and the inlet-side edges of the mixed flow turbine moving blades. Furthermore, since the hub side decreases in radius, the flow rate at the hub side increases in accordance with the conservation of angular momentum, frictional loss on the hub-side wall surface increases, and therefore the boundary layer may expand in the vicinity of the hub circumferential surface. In other words, when a radially inward spiral flow runs on an inclined surface, the flow tends to run backward and radially outward because of the action of centrifugal force due to the spiral, and thus a boundary layer may expand more than a boundary layer on a flat plate.

Therefore, a guide plate, which is a substantially extended portion of the hub-side blade-shaped nozzle, is provided from the trailing edge of the hub-side blade-shaped nozzle to a position close to the inlet-side edges of the mixed flow turbine moving blades, which can prevent the tendency for the flow to run backward and radially outward, thereby preventing expansion of a boundary layer.

In the above configuration, it is preferable that a shroud-side blade-shaped nozzle whose blade surfaces are formed substantially parallel to the rotation axis be provided in the shroud-side inlet channel, and that the throat width of the shroud-side blade-shaped nozzle be set larger than the throat width of the hub-side blade-shaped nozzle.

The blade angle of the inlet-side edges of the mixed flow turbine moving blades is as large as, for example, 40 degrees, at the hub side, and at the shroud-side, it is as small as, for example, the blade angle of the moving blades of a mixed flow turbine. In other words, the turbine characteristics that the flow of the shroud side exhibits are reaction turbine characteristics, and the turbine characteristics that the flow of the hub side exhibits are impact turbine characteristics.

Since the throat width of the shroud-side blade-shaped nozzle is set larger than the throat width of the hub-side blade-shaped nozzle, the angle of the blades of the shroud-side blade-shaped nozzle relative to the circumference is larger than that of the hub-side blade-shaped nozzle.

Accordingly, this allows the hub-side blade-shaped nozzle to have a nozzle blade angle suitable for the hub-side area having impact turbine characteristics and allows the shroud-side blade-shaped nozzle to have a nozzle blade angle suitable for the shroud-side area having reaction turbine characteristics.

In the above aspect, the inlet of the scroll may be provided with an inlet partition wall that separates the inlet into a shroud-side flow channel communicating with the shroud-side space and a hub-side flow channel communicating with the hub-side space; the inlet partition wall may be mounted at a position at which the cross-sectional area of the shroud-side flow channel is larger than the cross-sectional area of the hub-side flow channel; and the upstream side of the inlet partition wall may be provided with a control member that allows at least the shroud-side flow channel to be fully closed and controls the working-fluid inflow ratio of the shroud-side flow channel to the hub-side flow channel.

With this configuration, working fluid is separated by the inlet partition wall into the shroud-side flow channel and the hub-side flow channel.

The working fluid that has flowed into the shroud-side flow channel is supplied to the shroud side of the inlet-side edges of the mixed flow turbine moving blades through the shroud-side space and the shroud-side inlet channel.

On the other hand, the working fluid that has flowed into the hub-side flow channel is supplied to the hub side of the inlet-side edges of the mixed flow turbine moving blades through the hub-side space and the hub-side inlet channel.

At that time, since the shroud-side flow channel can be fully closed, the working fluid is allowed to flow only into the hub-side flow channel.

If the shroud-side flow channel is not fully closed, the working fluid is allowed to flow into the shroud-side flow channel and the hub-side flow channel at a flow rate according to a flow ratio adjusted by the control member.

For example, assuming that the condition of working fluid flowing to the hub side of the mixed flow turbine moving blades is substantially fixed, the flow ratio in the fully closed state at which working fluid flows only through the hub-side flow channel to the flow rate when working fluid flows through the shroud-side flow channel and the hub-side flow channel in the unchanged valve state differ. That is, the flow rate of working fluid depends on the flow-channel cross-sectional area of the hub-side flow channel in the former closed state, and in the latter state, depends on the sum of the flow-channel cross-sectional area of the shroud-side flow channel and the flow-channel cross-sectional area of the hub-side flow channel, and thus this ratio indicates a change in flow rate.

Since the inlet partition wall is mounted at a position at which the flow-channel cross-sectional area of the shroud-side flow channel is larger than the flow-channel cross-sectional area of the hub-side flow channel, the change in flow rate can be increased.

This allows coping with large fluctuations in the supply of working fluid, thus improving the controllability of a mixed flow turbine.

The turbine characteristics exhibited by the flow at the shroud side of the mixed flow turbine moving blades are reaction turbine characteristics, and the turbine characteristics exhibited by the flow at the hub side are impact turbine characteristics.

The reaction turbine is highly efficient when U/CO is small, and the impact turbine is highly efficient when U/CO is large.

Since the control member allows the shroud-side flow channel to be fully closed, and can control the working-fluid inflow ratio of the shroud-side flow channel to the hub-side flow channel, the mixed flow turbine can be used in a high efficient state by controlling the working-fluid inflow ratio of the shroud-side flow channel to the hub-side flow channel.

For example, when the U/CO is small, the shroud-side flow channel is fully closed by the control member to allow the working fluid to flow only into the hub-side flow channel, thereby supplying the working fluid to the hub side of the inlet-side edges of the mixed flow turbine moving blades. This allows high-efficiency operation by the high-efficiency hub-side flow at a low U/CO.

In the above configuration, it is preferable that the control member be provided with a plate member that can pivot about a axial center which is mounted to the upstream end of the inlet partition wall.

This facilitates controlling the working-fluid flow ratio by pivoting the plate member.

To ensure control, it is preferable that the plate member be of a shape along the flow-channel cross-sectional form of a portion where it is disposed.

In the above configuration, it is preferable that the height, along the axial center, of the flow-channel cross section of the inlet of the scroll at which at least the plate member pivots be set substantially constant, and that the length, along the axial center, of the plate member be set substantially the same as the height.

This can substantially prevent leakage of working fluid from the ends of the plate member orthogonal to the axial center, which can increase the accuracy of control, thereby preventing a decrease in efficiency.

It is preferable that the shape of the flow-channel cross section and the plate member be, for example, a rectangle and an oblong figure having a linear portion.

According to the present invention, the scroll is separated by a scroll partition wall into a shroud-side space and a hub-side space; and a shroud-side partition wall surface and a hub-side partition wall surface at the rear edge side of the scroll partition wall form a shroud-side inlet channel in which the working fluid flows substantially radially and a hub-side inlet channel in which the working fluid flows substantially in the same direction as the inclination direction of a hub circumferential surface at the inlet of the mixed flow turbine moving blades between the partition wall surfaces and portions facing the partition wall surfaces, respectively; therefore, this can prevent an increase in the size of a wall-surface boundary layer on the hub circumferential surface and the shroud at the inlet-side edges of the moving blades and can eliminate the influence of a wake due to the scroll partition wall in the center. This allows an incidence reducing effect of the moving blades whose inlet-side edges are formed in a convex shape toward the upstream side to be reliably achieved, thus reducing incidence loss.

DETAILED DESCRIPTION OF THE INVENTION

Embodiments of the present invention will be described below with reference to the drawings.

First Embodiment

Figure 2:
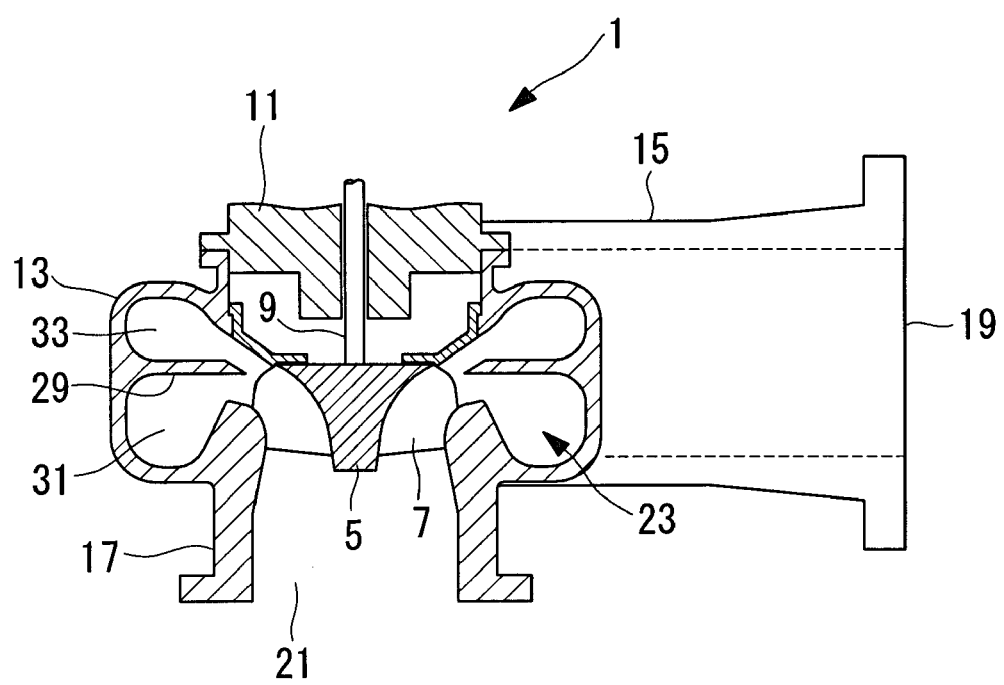
FIG. 2 is an X-X sectional view of FIG. 1.
Figure 3:
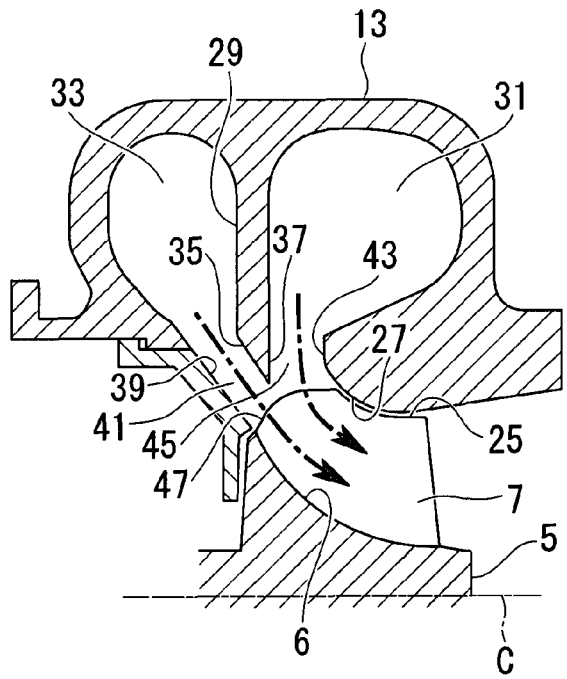
FIG. 3 is a fragmentary sectional view showing part of FIG. 2 in an enlarged scale.

A mixed flow turbine 1 according to a first embodiment of the present invention will be described below with reference to FIGS. 1 to 3. The mixed flow turbine 1 is used in a turbocharger for an automobile diesel engine.

Figure 1:
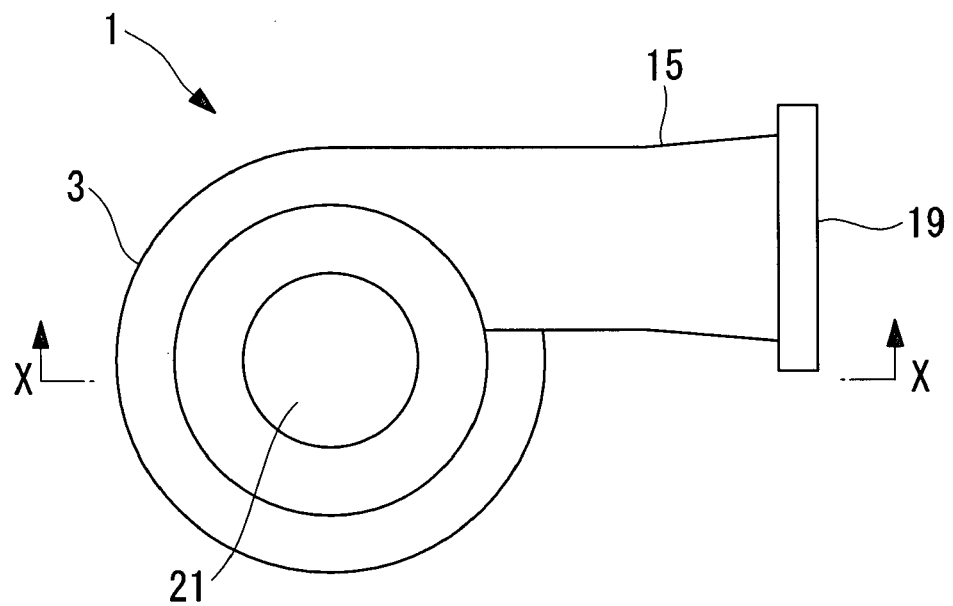
FIG. 1 is a front view of a casing of a mixed flow turbine according to a first embodiment of the present invention.

FIG. 1 is a front view of a casing 3 of the mixed flow turbine 1 of this embodiment. FIG. 2 is an X-X sectional view of FIG. 1. FIG. 3 is a fragmentary sectional view showing part of FIG. 2 in an enlarged scale.

The mixed flow turbine 1 is provided with the casing 3, a hub 5, and a plurality of blades (mixed flow turbine moving blades) 7 provided at substantially equal intervals around a circumferential surface 6 of the hub 5.

A rotation shaft 9 is fixed to the axial central portion of the hub 5. The rotation shaft 9 is freely rotatably supported by a bearing (not shown) attached to a bearing housing 11, and the other end is connected to a turbocompressor (not shown).

The casing 3 is provided with a substantially hollow cylindrical main body 13, a substantially hollow cylindrical inlet section (inlet of the scroll) 15 connected to the main body 13 in the direction of the tangential line, and a substantially hollow cylindrical discharge section 17 protruding from one surface of the main body 13 so as to have a substantially coaxial center C.

The inlet section 15 is connected to an exhaust section of a diesel engine (not shown), and the discharge section 17 is connected to an exhaust section of an automobile (not shown).

The hollow portions of the main body 13, the inlet section 15, and the discharge section 17 communicate with one another, and exhaust gas (working fluid) exhausted from the diesel engine and introduced through an inlet 19 of the inlet section 15 acts on the blades 7 in the main body 13 to rotate the hub 5 and is then exhausted from an outlet 21 of the discharge section 17.

The rotation of the hub 5 is transmitted to a turbocompressor (not shown), so that the turbocompressor is rotated. The rotation of the turbocompressor causes air to be compressed and the air is supplied to the diesel engine.

The inner space of the main body 13 constitutes a scroll 23 that accelerates the exhaust gas and supplies it to the blades 7. A shroud 27 that covers outside-diameter edges 25 of the blades 7 is formed inside the main body 13, as shown in FIG. 3.

A scroll partition wall 29 that projects from the outside toward the inside in the radial direction is provided inside the main body 13. The scroll 23 is separated by the scroll partition wall 29 into a shroud-side space 31 and a hub-side space 33.

The hub side at the inner-periphery (trailing edge) side of the scroll partition wall 29 forms a hub-side partition wall surface 35 inclined so as to be tapered toward the shroud side. The shroud side at the inner-periphery side of the scroll partition wall 29 forms a shroud-side partition wall surface 37 extending substantially radially.

A hub-side wall surface 39 opposing the hub-side partition wall surface 35 at the hub side of the casing 3 is configured to be substantially parallel to the hub-side partition wall surface 35 and forms a hub-side inlet channel 41 between it and the hub-side partition wall surface 35.

The hub-side inlet channel 41 is inclined in substantially the same inclination direction as the inclination direction of the upstream end of the circumferential surface 6 of the hub 5.

A shroud-side wall surface 43 opposing the shroud-side partition wall surface 37 on the shroud side of the casing 3 is configured to be substantially parallel to the shroud-side partition wall surface 37 and forms a shroud-side inlet channel 45 between it and the shroud-side partition wall surface 37.

Since the shroud-side partition wall surface 37 extends substantially radially, the shroud-side inlet channel 45 extends substantially radially.

The blades 7 are plate-like members formed vertically erected from the circumferential surface 6 of the hub 5 in such a manner that their surfaces extend in the axial direction.

The intersection of a leading edge 47 and the outside-diameter edge 25 is located farther outside, in the radial direction, with respect to the intersection of the hub 5 and the leading edge 47.

The blades 7 are each provided with the leading edge (inlet-side edge) 47 located at the upstream side in the exhaust-gas flowing direction. The leading edge 47 is formed of a curve that expands smoothly like a convex over the entire region thereof to the upstream side, as shown in FIG. 3.

The shroud-side portion of the leading edge 47 is shaped so as to extend along substantially the same radial position, in other words, so as to be substantially orthogonal to the radial direction.

The blade 7 has a parabolic shape that forms, when projected at a given radius, a convexity in the rotating direction from the leading edge 47 toward the downstream side.

Figure 20:
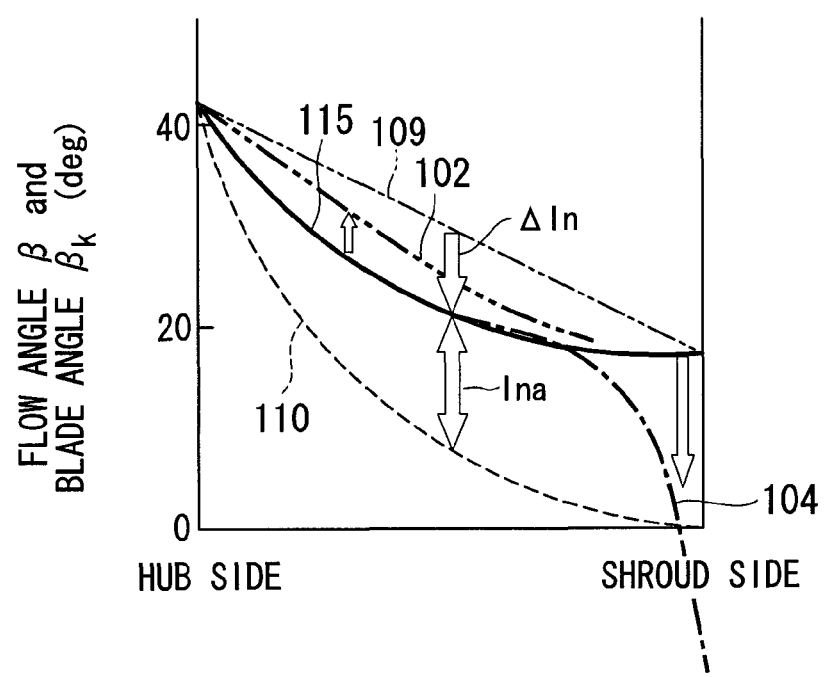
FIG. 20 is a graph showing the incidence distribution of the conventional mixed flow turbine.
Figure 21:
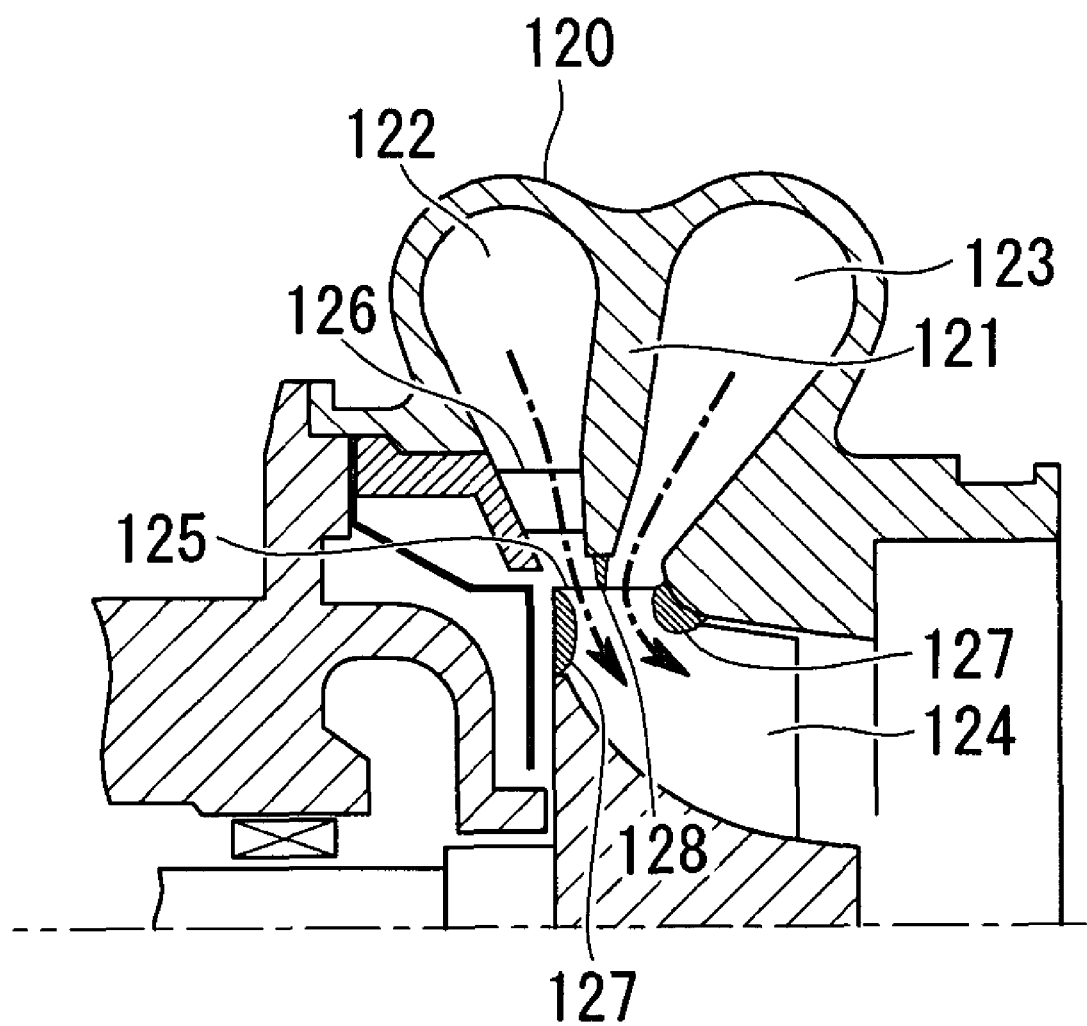
FIG. 21 is a fragmentary longitudinal sectional view of the main body of another conventional mixed flow turbine.

The blade angle $\beta k$ of the leading edge 47 is configured to decrease parabolically from the hub 5 side to the outside-diameter edge 25 side, like the conventional one shown in FIG. 20, for example. The blade angle $\beta k$ at the leading edge 47 is set, for example, at 40 degrees at the hub 5 side and at 0 degree at the outside-diameter edge 25 side.

The hub 5 and the blades 7 are integrally formed by casting or cutting. Alternatively, the hub 5 and the blades 7 may be separate objects that are then securely fixed together by welding or the like.

The action of the mixed flow turbine 1 according to this embodiment, described above, will be described.

The exhaust gas from the diesel engine flows through the inlet 19 into the inlet section 15 and is supplied to the main body 13. The exhaust gas that has flowed into the main body 13 is separated by the scroll partition wall 29 and flows into the shroud-side space 31 and the hub-side space 33, respectively.

The exhaust gas that has flowed into the shroud-side space 31 is supplied to the leading edges 47 of the blades 7 through the shroud-side inlet channel 45.

At that time, the exhaust gas flows substantially radially since the shroud-side inlet channel 45 extends substantially radially. Since the shroud-side portions of the leading edges 47 are substantially orthogonal to the radial direction, the exhaust gas flows so as to be substantially orthogonal thereto. Thus, this can prevent a wall-surface boundary layer from increasing in size in the vicinity of the leading edges 47 at the shroud 27.

On the other hand, the exhaust gas that has flowed into the hub-side space 33 is supplied to the leading edges 47 of the blades 7 through the hub-side inlet channel 41.

At that time, the exhaust gas that is supplied to the leading edges 47 through the hub-side inlet channel 41 flows parallel to the hub circumferential surface 6 since the hub-side inlet channel 41 is formed in substantially the same inclination direction as the inclination direction of the upstream end of the circumferential surface 6 of the hub 5. Accordingly, this can prevent a wall-surface boundary layer from increasing in size in the vicinity of the leading edges 47 at the circumferential surface 6.

The exhaust gas flows substantially radially in the shroud-side inlet channel 45, whereas it flows in substantially the same direction as the inclination direction of the circumferential surface 6 at the leading edges 47. Since the shroud-side partition wall surface 37 and the hub-side partition wall surface 35 join at the trailing edge of the scroll partition wall 29, the exhaust gas that flows in the shroud-side inlet channel 45 and the hub-side inlet channel 41 join at the trailing edge of the scroll partition wall 29. This can prevent development of a wake that is generated at the trailing edge of the scroll partition wall 29.

This results in the absence of an object that stops the flow of exhaust gas at the upstream side, as viewed from the leading edges 47.

Thus, since this can prevent an increase in the size of the wall-surface boundary layer on the circumferential surface 6 of the hub 5 and the shroud 27 at the leading edges 47 of the blades 7 and eliminates the influence of a wake due to the scroll partition wall 29 in the center, an incidence reducing effect of the blades 7, whose leading edges 47 are formed in a convex shape toward the upstream side, can be reliably achieved, and thus incidence loss can be reduced.

Figure 4:
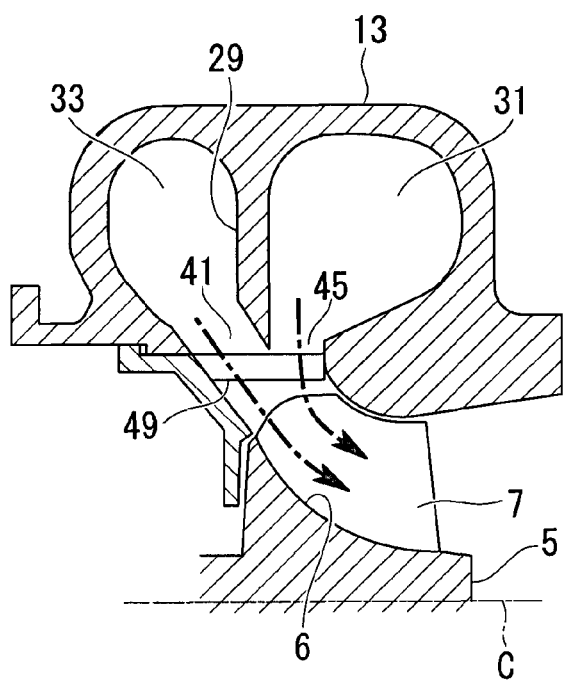
FIG. 4 is a fragmentary sectional view showing part of another embodiment, similar to the mixed flow turbine according to the first embodiment of the present invention shown in FIG. 3.

As shown in FIG. 4, a blade-shaped nozzle 49 whose blade surface is formed substantially parallel to the rotation axis C may be provided between the scroll partition wall 29 and the blades 7.

Provision of this blade-shaped nozzle 49 can increase the circumferential speed of the flow, thus increasing the efficiency of the mixed flow turbine 1.

Since the blade-shaped nozzle 49 is formed such that the blade surfaces are substantially parallel to the rotation axis C, it can easily be manufactured by casting.

The exhaust gas that has flowed to the blades 7 passes between the blades 7. At that time, the exhaust gas pushes the pressure surfaces of the blades 7 to move the blades 7 in the rotating direction.

Thus, the hub 5 integrated with the blades 7 rotates in the rotating direction. The rotating force of the hub 5 rotates the turbocompressor via the rotation shaft 9. The turbocompressor compresses air and supplies it as compressed air to the diesel engine.

Second Embodiment

Next, a second embodiment of the present invention will be described with reference to FIGS. 5 and 6.

A mixed flow turbine 1 of this embodiment differs from that of the above-described first embodiment in the configuration of the hub-side inlet channel 41. Since the other components are the same as those of the above-described first embodiment, duplicated descriptions of the components will be omitted herein.

The same components as those of the above-described first embodiment are given the same reference numerals.

Figure 5:
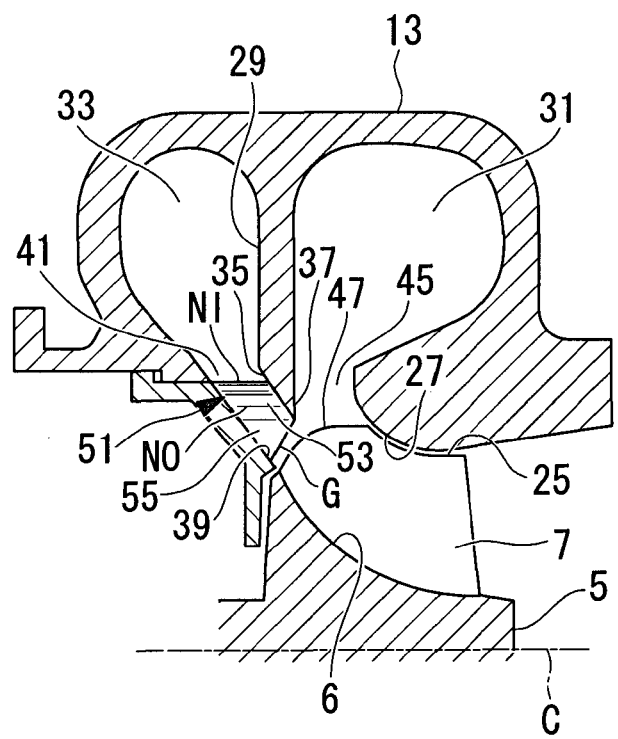
FIG. 5 is a fragmentary longitudinal sectional view of part of the main body of a mixed flow turbine according to a second embodiment of the present invention.

FIG. 5 is a fragmentary longitudinal sectional view of part of the main body 13. FIG. 6 is a schematic diagram showing the shape of blades 53 and guide plates 55 of a hub-side blade-shaped nozzle 51.

In this embodiment, the hub-side inlet channel 41 is provided with the hub-side blade-shaped nozzle 51 constituted by the plurality of blades 53 whose blade surfaces are formed substantially parallel to the rotation axis C.

Figure 6:
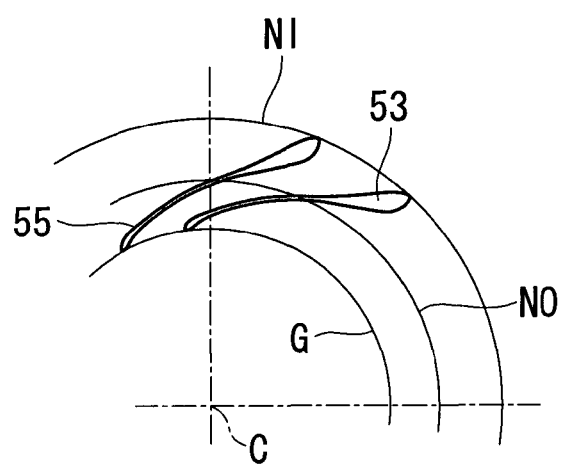
FIG. 6 is a schematic diagram showing the shape of blades and guide plates of a hub-side nozzle according to the second embodiment of the present invention.

As shown in FIG. 6, the blades 53 of the hub-side blade-shaped nozzle 51 are mounted in such a manner as to incline at a predetermined angle relative to the circumference.

The blades 53 are mounted between a nozzle inlet radius NI and a nozzle outlet radius NO.

Since the hub-side blade-shaped nozzle 51 is formed such that the blade surfaces are substantially parallel to the rotation axis C, it can easily be manufactured by casting.

The guide plates 55 are mounted to the downstream side of the hub-side blade-shaped nozzle 51 in correspondence with the individual blades 53.

The guide plates 55 have a logarithmic spiral cross section and are mounted so as to be substantially extending portions of the blades 53.

The downstream ends G of the guide plate 55 extend near to the leading edges 47 to form a shape substantially along the hub-side shape of the leading edges 47.

Since the action of the mixed flow turbine 1 with such a configuration according to this embodiment is basically the same as that of the above-described first embodiment, duplicated descriptions will be omitted and differences will be described.

Since the hub-side inlet channel 41 inclines with respect to the radial direction, it is longer than the shroud-side inlet channel 45 along the radius. Furthermore, since the hub side decreases in radius, the flow rate of the hub side is high in accordance with the conservation of angular momentum. Therefore, the exhaust gas has increased frictional loss on the hub-side wall surface 39, and therefore the boundary layer may expand in the vicinity of the leading edges 47 on the circumferential surface 6 of the hub 5.

Since this embodiment is provided with the hub-side blade-shaped nozzle 51 in the hub-side inlet channel 41, the circumferential speed of the flow in the hub-side inlet channel 41 can be increased.

This can prevent expansion of the boundary layer and improve the efficiency of the mixed flow turbine 1.

Since the hub-side inlet channel 41 inclines with respect to the radial direction, and the hub-side blade-shaped nozzle 51 is formed substantially parallel to the rotation axis C, a long space is formed between the trailing edge of the hub-side blade-shaped nozzle 51 and the leading edges 47 of the blades 7. Furthermore, since the hub side decreases in radius, the flow rate at the hub side increases in accordance with the conservation of angular momentum, frictional loss on the hub-side wall surface 39 increases, and therefore the boundary layer may expand in the vicinity of the circumferential surface 6 of the hub 5. In other words, when a radially inward spiral flow runs on an inclined surface, the flow tends to run backward radially outward because of the action of centrifugal force due to the spiral, and thus a boundary layer may expand more than a boundary layer on a flat plate.

In this embodiment, the flow that has left the blades 53 of the hub-side blade-shaped nozzle 51 is guided to the vicinity of the leading edges 47 by the guide plates 55.

Since the flow that has left the hub-side blade-shaped nozzle 51 flows in accordance with the conservation of angular momentum, it flows ideally in a logarithmic spiral shape.

Since the guide plates 55 are shaped in a logarithmic spiral cross section, this ideal flow can be maintained.

The guide plates 55 may be omitted depending on the conditions because they are used as necessary.

Third Embodiment

Next, a third embodiment of the present invention will be described with reference to FIGS. 7 and 8.

A mixed flow turbine 1 of this embodiment differs from that of the above-described second embodiment in the configuration of the shroud-side inlet channel 45. Since the other components are the same as those of the above-described second embodiment (and the first embodiment), duplicated descriptions of the components will be omitted herein.

The same components as those of the above-described first embodiment and second embodiment are given the same reference numerals.

Figure 7:
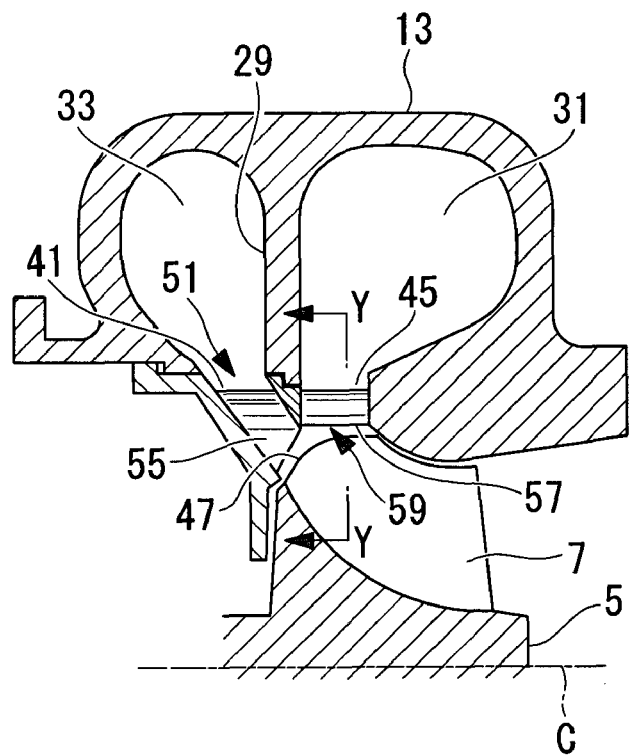
FIG. 7 is a fragmentary longitudinal sectional view of part of the main body of a mixed flow turbine according to a third embodiment of the present invention.

FIG. 7 is a fragmentary longitudinal sectional view of part of the main body 13. FIG. 8 is a Y-Y cross section of FIG. 7.

In this embodiment, the shroud-side inlet channel 45 is provided with a shroud-side blade-shaped nozzle 59 constituted by a plurality of blades 57 whose blade surfaces are formed substantially parallel to the rotation axis C. Since the shroud-side blade-shaped nozzle 59 is formed such that the blade surfaces are substantially parallel to the rotation axis C, it can easily be manufactured by casting.

Figure 8:
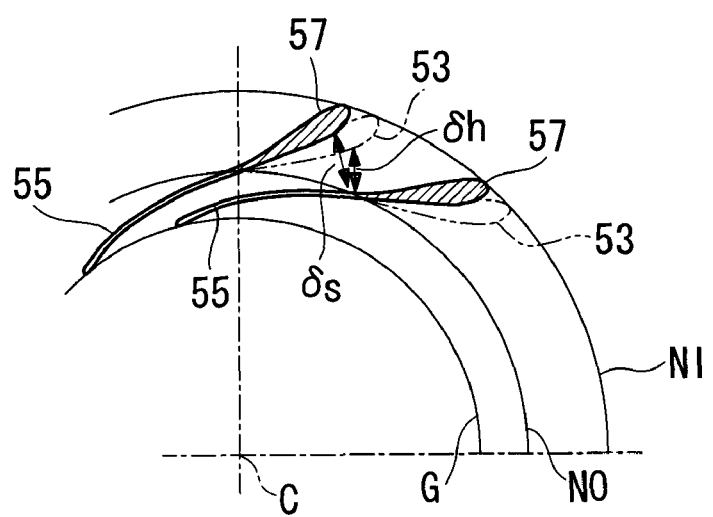
FIG. 8 is a Y-Y cross section of FIG. 7.

As shown in FIG. 8, the blades 57 are mounted in such a manner as to incline at a predetermined angle (blade angle) relative to the circumference.

As shown in FIG. 8, the blade angles of the blades 57 are set larger than the blade angles of the blades 53. Thus, the throat width $\delta s$ (the width at a portion where the flow is reduced most) of the shroud-side blade-shaped nozzle 59 is larger than the throat width $\delta h$ of the hub-side blade-shaped nozzle 51. Thus, the flow rate at shroud-side blade-shaped nozzle 59 is larger than that at the hub-side blade-shaped nozzle 51.

Since the action of the mixed flow turbine 1 with such a configuration according to this embodiment is basically the same as those of the above-described first embodiment and second embodiment, duplicated descriptions will be omitted and differences will be described.

The blade angle of the leading edges 47 of the blades 7 is as large as, for example, 40 degrees, at the hub side, and at the shroud-side, it is as small as, for example, the blade angle of the moving blades of a mixed flow turbine. In other words, the turbine characteristics exhibited by the flow at the shroud side are reaction turbine characteristics, and the turbine characteristics exhibited by the flow at the hub side are impact turbine characteristics.

The exhaust gas flowing through the shroud-side inlet channel 45 is guided by the relatively small blade angle of the shroud-side blade-shaped nozzle 59 and flows smoothly to the shroud side of the leading edges 47 having a relatively small blade angle. On the other hand, the exhaust gas flowing through the hub-side inlet channel 41 is guided by the relatively large blade angle of the hub-side blade-shaped nozzle 51 and flows smoothly to the hub side of the leading edges 47 having a relatively large blade angle.

Thus, setting the throat width $\delta s$ of the shroud-side blade-shaped nozzle 59 larger than the throat width $\delta h$ of the hub-side blade-shaped nozzle 51 allows the hub-side blade-shaped nozzle 51 to have a nozzle blade angle suitable for the hub-side area having impact turbine characteristics and allows the shroud-side blade-shaped nozzle 59 to have a nozzle blade angle suitable for the shroud-side area having reaction turbine characteristics.

The guide plates 55 may be omitted depending on the conditions because they are used as necessary.

Fourth Embodiment

Next, a fourth embodiment of the present invention will be described with reference to FIGS. 9 to 17.

A mixed flow turbine 1 of this embodiment is the same as the above-described second embodiment in basic configuration and differs in the configuration of the inlet section 15. Accordingly, this difference will be mainly described, and duplicated descriptions of the other components will be omitted herein.

The same components as those of the above-described first and second embodiments are given the same reference numerals.

Figure 9:
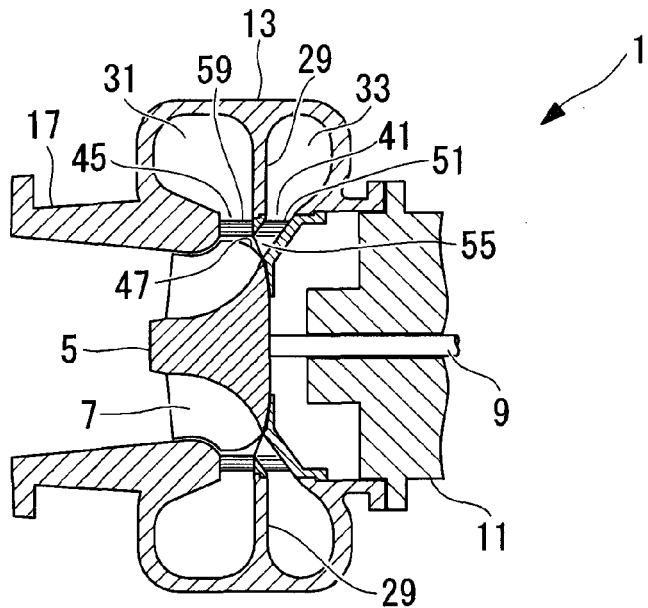
FIG. 9 is a longitudinal sectional view of a mixed flow turbine according to a fourth embodiment of the present invention.
Figure 9:
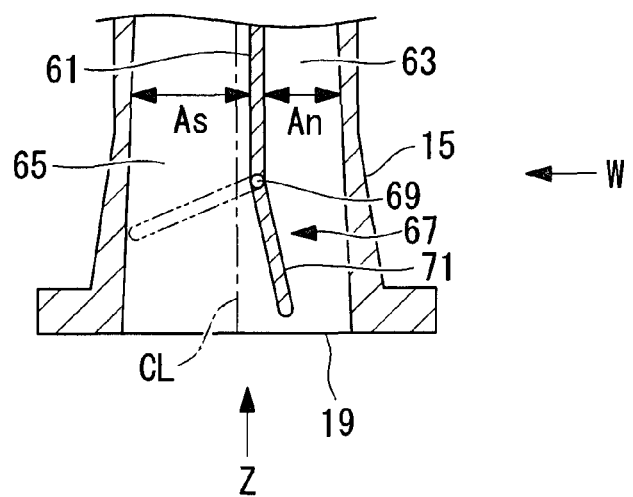
Figure 10:
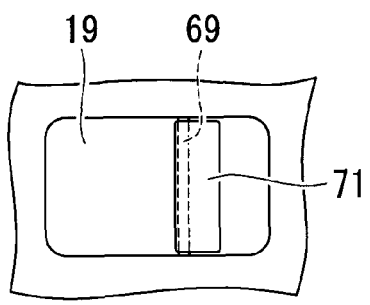
FIG. 10 is a diagram as viewed from Z in FIG. 9.
Figure 11:
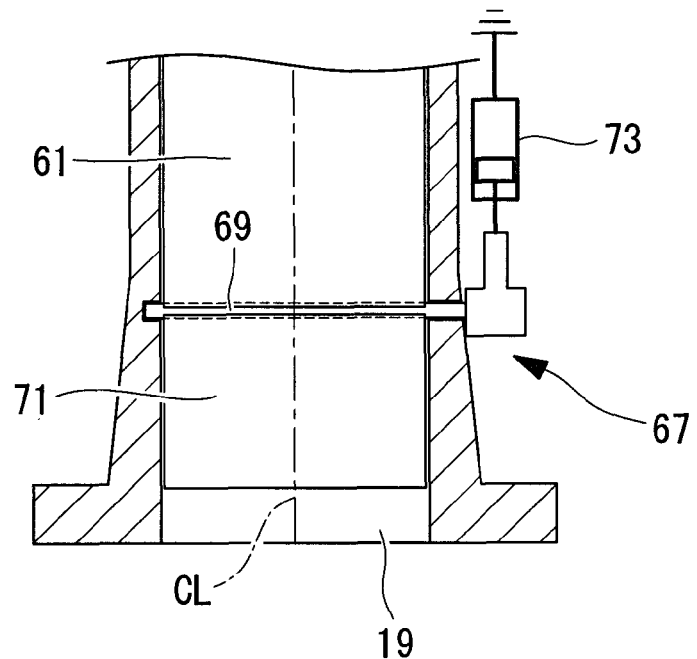
FIG. 11 is a diagram as viewed from W in FIG. 9.
Figure 12:
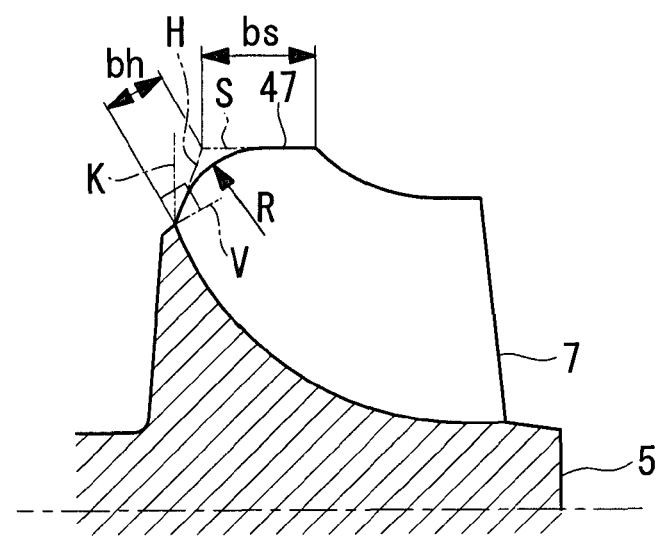
FIG. 12 is a longitudinal sectional view of a blade 7 and a hub according to the fourth embodiment of the present invention.

FIG. 9 is a longitudinal sectional view of the mixed flow turbine 1. FIG. 10 is a diagram as viewed from Z in FIG. 9. FIG. 11 is a diagram as viewed from W in FIG. 9. FIG. 12 is a longitudinal sectional view of the blade 7 and the hub 5.

The mixed flow turbine 1 according to this embodiment is of a variable displacement type whose capacity can be changed in a broad range.

In the case where the pressure ratio of the inlet of the turbine to the outlet is constant, when a turbocharger that incorporates the mixed flow turbine 1 is mounted in a passenger car, a truck, or the like, their engine characteristics require that the flow ratio of the minimum flow rate of the mixed flow turbine 1 to the maximum flow rate vary in the range from 1:3 to 1:5.

The inlet section 15 is substantially rectangular in cross section. The inner space of the inlet section 15 is partitioned by an inlet partition wall 61 into a hub-side flow channel 63 that communicates with the hub-side space 33 and a shroud-side flow channel 65 that communicates with the shroud-side space 31.

The inlet partition wall 61 is disposed substantially parallel to one side of the rectangular inner space. The inlet partition wall 61 is disposed in a position displaced from the center line CL of a side substantially perpendicular to the one side so that the cross-sectional area of the hub-side flow channel 63 is smaller than the cross-sectional area of the shroud-side flow channel 65.

Although the amount of displacement is set as appropriate, here it is set so that the cross-sectional area of the hub-side flow channel 63 is substantially half of the cross-sectional area of the shroud-side flow channel 65.

That is, since the widths are almost the same, the height AH of the hub-side flow channel 63 is set at substantially half of the height As of the shroud-side flow channel 65, in other words, Ah:As≈1:2.

The upstream end, which is the upstream portion of the inlet partition wall 61, is provided with a flow-rate adjusting valve (control member) 67.

The flow-rate adjusting valve 67 is provided with a pivot shaft 69 that is rotatably mounted to the upstream end of the inlet section 15 and the inlet partition wall 61, a rectangular valve element (plate member) 71 one side of which is fixed to the pivot shaft 69, and a hydraulic cylinder 73 that rotates the pivot shaft 69 around the axial center.

The height, along the pivot shaft 69, of the inner space of the rectangular inlet section 15 is substantially fixed, and the length of the valve element 71 along the pivot shaft 69 is set substantially the same as the height.

This allows the gap between the inner wall surface of the inlet section 15 and the valve element 71 to be maintained constant at all degrees of opening when the valve element 71 moves. This also allows a flow at the shroud side of the valve element 71 to run into the shroud-side flow channel 65 substantially uniformly in the height direction and allows a flow at the hub side of the valve element 71 to run into the scroll substantially uniformly in the height direction.

The cross-sectional shape of the inner space of the inlet section 15 and the shape of the valve element 71 are not limited to rectangular and may be any shape.

In this case, it is preferable that the cross section of the flow channel of the inner space of the inlet section 15 where the valve element 71 pivots be substantially fixed in height along the pivot shaft 69, and that the length, along the pivot shaft 69, of the valve element 71 be substantially the same as the height. The shape may be, for example, an oblong figure having a linear portion.

This can substantially prevent leakage of working fluid from the ends of the valve element 71 orthogonal to the pivot shaft 69, which can increase the accuracy of control, thereby preventing a decrease in efficiency.

The minimum length of the valve element 71 and the range of expansion and contraction of the hydraulic cylinder 73 are set so that the valve element 71 can fully close the shroud-side flow channel 65.

The range of expansion and contraction of the hydraulic cylinder 73 is limited so that, when the valve angle of the valve element 71 when the valve element 71 is set so as to narrow the hub-side flow channel 63 is defined to be minus, the maximum angle on the minus side is from −20 to −30 degrees.

The maximum length of the valve element 71 is set so that, when it has reached the maximum angle on the minus side, the ratio of the area of the end portion to the area of the hub-side flow channel 63 becomes 1:2.5 or less. This is because, since the flow channel constituted by the valve element 71 and the scroll wall serves as a diffuser, pressure loss increases rapidly if the area ratio exceeds 2.5.

FIG. 12 shows the shape of the leading edge 47 of the blade 7. Let the straight line at the middle angle between a radial line K and a perpendicular line V perpendicular to the circumferential surface of the hub 5 be a straight line H, and a straight line at a fixed radius close to the shroud be a straight line S. The leading edge 47 is shaped such that the hub side follows the straight line H, the shroud side substantially follows the straight line S, and the intermediate portion is shaped in arc connecting the two straight lines.

This shape allows the distance between the trailing edge of the shroud-side blade-shaped nozzle 59 and the leading edges 47 and the distance between the trailing edges of the guide plates 55 provided downstream of the hub-side blade-shaped nozzle 51 and the leading edges 47 to be held substantially constant.

The relationship between the representative length bh of the hub side of the leading edge 47 and the representative length bs of the shroud side is set at bh:bs≈2:3.

The relationship between the throat width δh of the hub-side blade-shaped nozzle 51 and the throat width δs of the shroud-side blade-shaped nozzle 59 is set at δh:δs≈3:4.

Thus, the relationship between the throat area Sh of the hub-side blade-shaped nozzle 51 and the throat area St of the shroud-side blade-shaped nozzle 59 becomes 2×3:3×4≈1:2.

That is, the area ratio of the hub-side flow channel 63 to the shroud-side flow channel 65, serving as the inlet, and the area ratio of the throats serving as the outlet are set substantially the same.

Since the action of the mixed flow turbine 1 with such a configuration according to this embodiment is basically the same as those of the above-described first embodiment, second embodiment, and third embodiment, duplicated descriptions will be omitted and differences will be described.

According to this embodiment, the exhaust gas that flows into the inlet section 15 is separated by the inlet partition wall 61 into the shroud-side flow channel 65 and the hub-side flow channel 63.

The exhaust gas that has flowed into the shroud-side flow channel 65 is supplied to the shroud side of the leading edges 47 of the blades 7 through the shroud-side space 31 and the shroud-side inlet channel 45.

On the other hand, the exhaust gas that has flowed into the hub-side flow channel 63 is supplied to the hub side of the leading edges 47 of the blades 7 through the hub-side space 33 and the hub-side inlet channel 41.

At that time, of the shroud-side flow channel 65 and the hub-side flow channel 63, the shroud-side flow channel 65 can be fully closed, so that the working fluid is allowed to flow only into the hub-side flow channel 63.

If the shroud-side flow channel 65 is not fully closed, the exhaust gas is allowed to flow into the shroud-side flow channel 65 and the hub-side flow channel 63 at a flow rate according to a flow ratio adjusted by the valve element 71.

Figure 13:
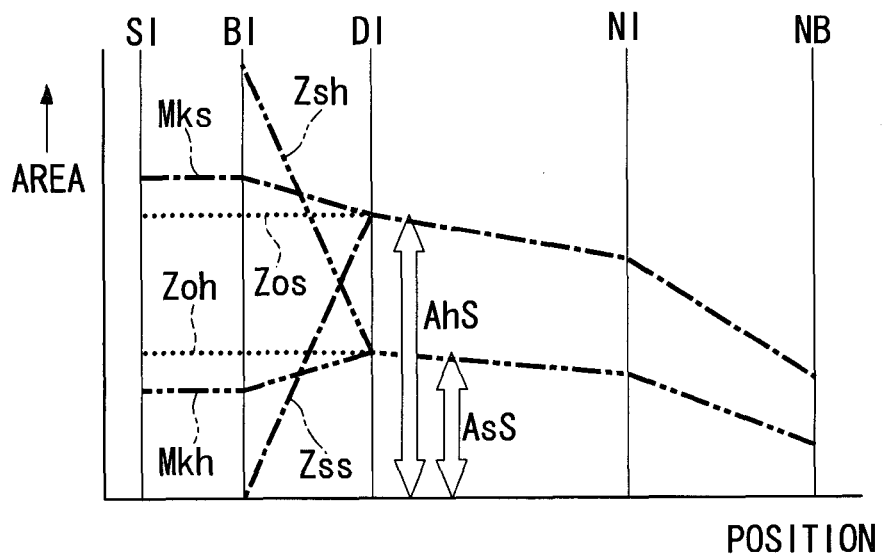
FIG. 13 is a graph showing changes in a hub-side flow channel area and a shroud-side flow channel area at various positions of a valve according to the fourth embodiment of the present invention.

FIG. 13 shows the relationship between a hub-side flow channel area AhS and a shroud-side flow channel area AsS at various flow channel positions.

The flow channel positions at various positions are the position SI of the inlet 19 which is the inlet of the scroll, the distal end BI of the valve element 71, the upstream end DI of the inlet partition wall 61, a nozzle inlet radius NI position, and a nozzle outlet radius NO position.

When the valve element 71 is located at a position of the extension of the inlet partition wall 61, that is, at a fully open state, the hub-side flow channel area AhS and the shroud-side flow channel area AsS at position SI, position BI, and position DI are constant, as indicated by line Zos and line Zoh.

When the valve element 71 fully closes the shroud-side flow channel 65, that is, at a fully closed state, the shroud-side flow channel area AsS is zero at position BI, as indicated by line Zss, and increases toward position DI so as to reach the flow-channel area in the fully open state. On the other hand, the hub-side flow channel area AhS exhibits the whole flow channel area of the inlet section 15 at position BI, as indicated by line Zsh, and decreases toward position DI so as to reach the flow-channel area in the fully open state.

When the valve element 71 is located at a minus angle, the shroud-side flow channel area AsS increases at position BI by an area corresponding to the upstream end position of the valve element 71, as indicated by line Mks, and decreases toward the position DI so as to reach the flow-channel area in the fully open state. On the other hand, the hub-side flow channel area AhS decreases at position BI by an area corresponding to an increase in the shroud-side flow channel area AsS, as indicated by line Mkh, and increases toward position DI so as to reach the flow-channel area in the fully open state.

Since the hub-side flow channel 63, the hub-side space 33, and the hub-side inlet channel 41 gradually decrease in area, the hub-side flow channel area gradually decreases from position DI to position NO.

Since the shroud-side flow channel 65, the shroud-side space 31, and the shroud-side inlet channel 45 gradually decrease in area, the shroud-side flow channel area gradually decreases from position DI to position NO.

At the fully closed state, the exhaust gas flows only through the hub-side flow channel 63, and at the fully open state, it flows through the hub-side flow channel 63 and the shroud-side flow channel 65.

Since the cross-sectional area, that is, the flow channel area, of the hub-side flow channel 63 is set at substantially half of the cross-sectional area, that is, the flow channel area, of the shroud-side flow channel 65, the flow-channel area ratio in the fully closed state to that in the fully open state becomes 1:3.

For example, assuming that the conditions of working fluid flowing to the hub side of the leading edge 47 are substantially constant, the flow ratio in the fully closed state to the flow rate in the fully open state becomes 1:3.

In this way, since the inlet partition wall 61 is mounted at a position at which the flow-channel cross-sectional area of the shroud-side flow channel 65 is twice the flow-channel cross-sectional area of the hub-side flow channel 63, the flow ratio of the minimum flow rate to the maximum flow rate can be increased. This can improve the controllability of the mixed flow turbine 1 and the ability to respond to engine demands.

Furthermore, since, in the fully open state, exhaust gas of a quantity corresponding to the area ratio flows through the hub-side flow channel 63 and the shroud-side flow channel 65, the flow rates of the exhaust gas flowing through the hub-side flow channel 63 and the shroud-side flow channel 65 become substantially equal, which can make the pressure loss of the hub-side flow channel 63 and the shroud-side flow channel 65 substantially equal and the minimum.

The exhaust gas that has flowed into the shroud-side flow channel 65 and the hub-side flow channel 63 flows into the shroud-side space 31 and the hub-side space 33, respectively.

The exhaust gas that has flowed into the shroud-side space 31 is supplied to the leading edges 47 of the blades 7 through the shroud-side inlet channel 45. The exhaust gas that has flowed into the hub-side space 33 is supplied to the leading edges 47 of the blades 7 through the hub-side inlet channel 41.

At that time, as described in the first embodiment, since an increase in the size of the wall-surface boundary layer on the circumferential surface 6 of the hub 5 and the shroud 27 at the leading edges 47 of the blades 7 can be prevented, and the influence of a wake at the intermediate part due to the scroll partition wall 29 can be eliminated, the incidence reducing effect of the blades 7 whose leading edges 47 are formed in a convex shape toward the upstream side can be reliably achieved, and thus incidence loss can be reduced.

Figure 14:
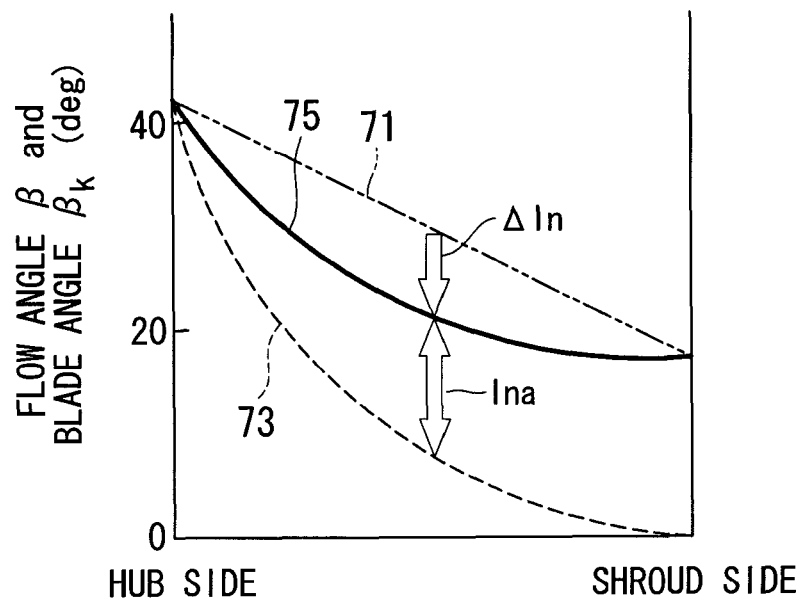
FIG. 14 is a graph showing an incidence distribution according to the fourth embodiment of the present invention.

That is, as shown in FIG. 14, with a conventional mixed flow turbine not having the features of Japanese Unexamined Patent Application, Publication No. 2004-92498, the flow angle $\beta$ 71 of the leading edges 47 of the blades 7 changes linearly between the hub 5 and the shroud 27. On the other hand, the blade angle $\beta k$ 73 changes parabolically, and therefore the incidence at the center of the blade height increases to the maximum.

In this embodiment, since the leading edges 47 of the blades 7 are formed in a convex shape toward the upstream side, the flow angle $\beta$ 75 decreases and changes like a curve, as shown in FIG. 14.

As a result, the distribution of the blade angle $\beta k$ 73 and the distribution of the flow angle $\beta$ 75 come close to each other at the center between the hub 5 and the shroud 27 to cause incidence Ina. That is, since the incidence decreases by $\Delta$In, incidence loss is reduced correspondingly.

Figure 15:
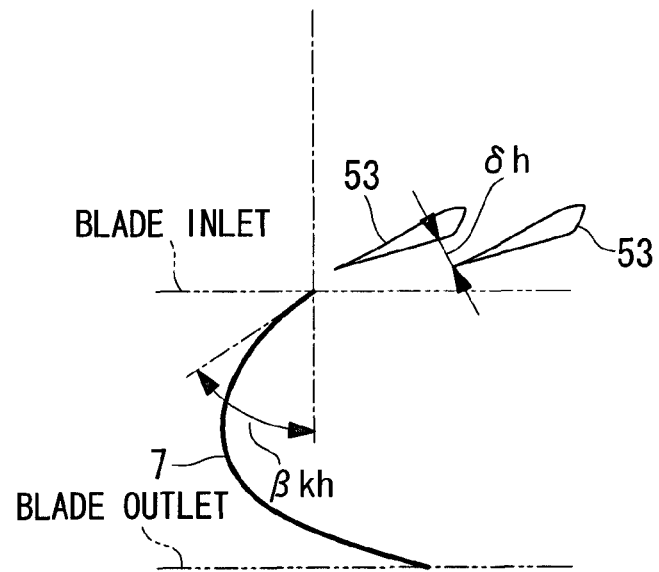
FIG. 15 is a diagram showing the relationship between the hub-side blade-shaped nozzle and the hub-side shape of the blades according to the fourth embodiment of the present invention.

FIG. 15 is a diagram showing the relationship between the hub-side blade-shaped nozzle 51 and the hub-side shape of the blade 7. The throat width $\delta h$ of the hub-side blade-shaped nozzle 51 is narrow, and the inclination angles of the blades 53 are small. On the other hand, the blade angle $\beta kh$ of the leading edge 47 of the blade 7 is set large. Turbines of this shape are called "impact turbines", which are highly efficient when U/CO is small.

Figure 16:
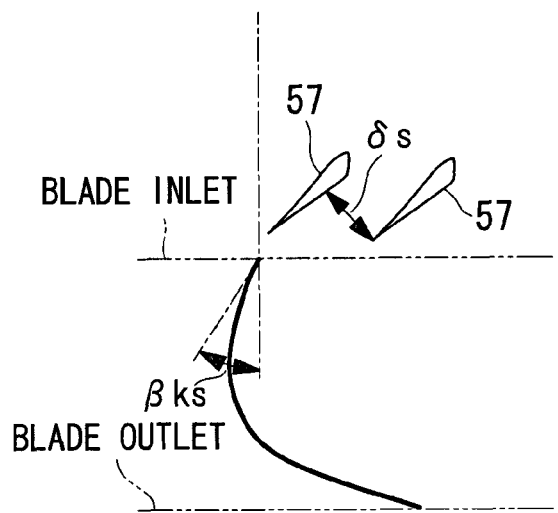
FIG. 16 is a diagram showing the relationship between the shroud-side blade-shaped nozzle and the shroud-side shape of the blades according to the fourth embodiment of the present invention.

FIG. 16 is a diagram showing the relationship between the shroud-side blade-shaped nozzle 59 and the shroud-side shape of the blade 7. The throat width $\delta s$ of the shroud-side blade-shaped nozzle 59 is wide, and the inclination angles of the blades 57 are small. On the other hand, the blade angle $\beta ks$ of the leading edge 47 of the blade 7 is set small. Turbines of this shape are called "reaction turbines", which are highly efficient when U/CO is large.

In the case where the mixed flow turbine 1 is used as a variable displacement turbocharger of passenger cars and trucks, U/CO decreases to 0.5 to 0.6 during acceleration, whereas U/CO increases to 0.7 to 0.8 at the maximum power output. A usable area UA is used when U/CO is in the range from 0.6 to 0.7.

Figure 17:
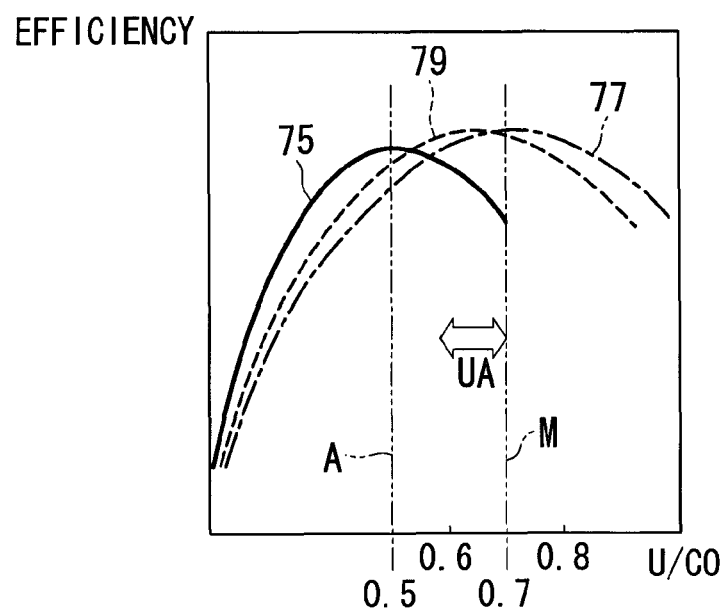
FIG. 17 is a diagram for describing the dimensionless characteristics of the mixed flow turbine according to the fourth embodiment of the present invention.
Figure 18:
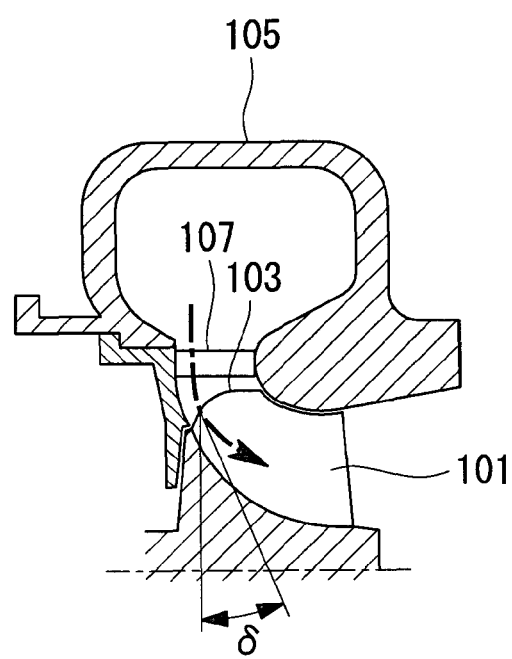
FIG. 18 is a fragmentary longitudinal sectional view of the main body of a conventional mixed flow turbine.
Figure 19:
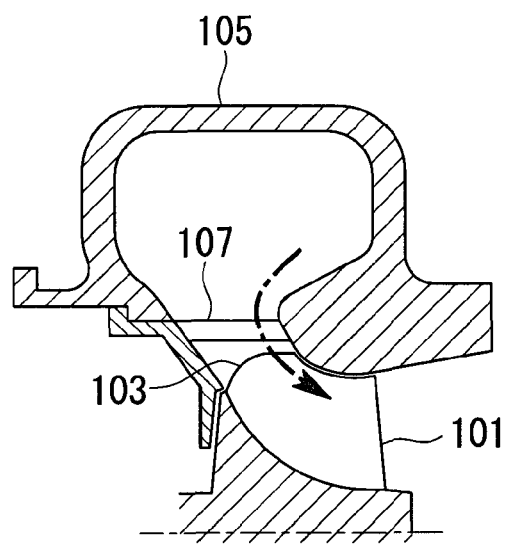
FIG. 19 is a fragmentary longitudinal sectional view of the main body of a conventional mixed flow turbine.

FIG. 17 is a diagram for describing the dimensionless characteristics of the mixed flow turbine 1.

When the valve element 71 is fully closed, exhaust gas flows only through the hub-side flow channel 63, and is supplied to the hub side of the leading edges 47 through the hub-side inlet channel 41, so that an efficient fully-closed characteristic 75 is exhibited at low U/CO.

On the other hand, in the fully open state, the exhaust gas flows through the hub-side flow channel 63 and the shroud-side flow channel 65, and is supplied to the hub side and the shroud side of the leading edges 47. At that time, since the quantity of exhaust gas supplied to the shroud side becomes substantially twice as much as the quantity of exhaust gas supplied to the hub side, the characteristic of the shroud-side flow predominates. Accordingly, an efficient fully-open characteristic 77 is exhibited at high U/CO.

When the valve element 71 comes to an intermediate position between the fully open state and the fully closed state, an intermediate-opening characteristic 79 between the fully-closed characteristic 75 and the fully-open characteristic 77 is exhibited.

The fully-closed characteristic 75 exhibits the maximum efficiency around an acceleration-time working point A, whereas the fully-open characteristic 77 exhibits the maximum efficiency around a maximum-power-output-time working point M. The intermediate opening characteristic 79 sometimes exhibits high efficiency at the usable area UA.

Thus, adjusting the opening of the valve element 71 allows continuous high-efficiency operation from the acceleration time to the maximum power output time.

When a higher U/CO characteristic is required depending on the operating point of the engine, the ratio of the shroud-side characteristic to the hub-side characteristic can be controlled so that the shroud-side characteristic predominates by controlling the angle of the valve element 71 to the minus side.

Although this embodiment uses the shroud-side blade-shaped nozzle 59, the hub-side blade-shaped nozzle 51, and the guide plates 55, they are used when needed, and may be omitted depending on the conditions. That is, the configuration of the inlet section 15 according to this embodiment may be combined with the configuration of the first embodiment or the second embodiment.

It is to be understood that the present invention is not limited to the above-described embodiments and that various modifications may be made as appropriate without departing from the spirit and scope of the present invention.

What is claimed is:

1. A mixed flow turbine comprising:
   mixed flow turbine moving blades having inlet-side edges located at an upstream side is formed in a convex shape toward the upstream side; and
   a scroll that is a space formed upstream of the mixed flow turbine moving blades by a casing having a shroud that covers the radially external edges of the mixed flow turbine moving blades, the space being for supplying working fluid toward the inlet-side edges of the mixed flow turbine moving blades,
   wherein the scroll is separated by a scroll partition wall into a shroud-side space and a hub-side space; and
   wherein a shroud-side partition wall surface and a hub-side partition wall surface at the rear edge side of the scroll partition wall form a shroud-side inlet channel in which the working fluid flows substantially radially and a hub-side inlet channel in which the working fluid flows substantially in the same direction as the inclination direction of a hub circumferential surface at the inlet of the mixed flow turbine moving blades between the partition wall surfaces and portions facing the partition wall surfaces, respectively, wherein the hub-side inlet channel is provided with a hub-side blade-shaped nozzle whose blade surfaces are formed substantially parallel to a rotation axis.

2. The mixed flow turbine according to claim 1, wherein the hub-side blade-shaped nozzle is provide with a guide plate, which is a substantially extended portion of the hub-side blade-shaped nozzle, extended to a position close to the inlet-side edges of the mixed flow turbine moving blades.

3. The mixed flow turbine according to claim 1, wherein a shroud-side blade-shaped nozzle whose blade surfaces are formed substantially parallel to the rotation axis is provided at the downstream portion of the shroud-side inlet channel, and the throat width of the shroud-side blade-shaped nozzle is set larger than the throat width of the hub-side blade-shaped nozzle.

4. The mixed flow turbine according to claim 1, wherein
   the inlet of the scroll is provided with an inlet partition wall that separates the inlet into a shroud-side flow channel communicating with the shroud-side space and a hub-side flow channel communicating with the hub-side space;
   the inlet partition wall is mounted at a position at which the cross-sectional area of the shroud-side flow channel is larger than the cross-sectional area of the hub-side flow channel; and
   the upstream side of the inlet partition wall is provided with a control member that allows at least the shroud-side flow channel to be fully closed and controls the working-fluid inflow ratio of the shroud-side flow channel to the hub-side flow channel.

5. The mixed flow turbine according to claim 4, wherein the control member is provided with a plate member that can pivot about a axial center which is mounted to the upstream end of the inlet partition wall.

6. The mixed flow turbine according to claim 5, wherein the height, along the axial center, of the flow-channel cross section of the inlet of the scroll at which at least the plate member pivots is set substantially constant, and the length, along the axial center, of the plate member is set substantially the same as the height.

* * * * *